(12) United States Patent
Kinami

(10) Patent No.: US 8,142,072 B2
(45) Date of Patent: Mar. 27, 2012

(54) EXTERNAL STIMULUS INDICATOR AND INDICATION METHOD USING THE SAME

(75) Inventor: Maki Kinami, Otsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 716 days.

(21) Appl. No.: 12/269,584

(22) Filed: Nov. 12, 2008

(65) Prior Publication Data

US 2009/0285258 A1 Nov. 19, 2009

(30) Foreign Application Priority Data

| May 13, 2008 | (JP) | ................................ | 2008-126300 |
| Jul. 8, 2008 | (JP) | ................................ | 2008-178248 |
| Jul. 8, 2008 | (JP) | ................................ | 2008-178249 |
| Jul. 8, 2008 | (JP) | ................................ | 2008-178250 |
| Jul. 22, 2008 | (JP) | ................................ | 2008-188625 |
| Jul. 31, 2008 | (JP) | ................................ | 2008-198294 |

(51) Int. Cl.
*G01K 3/04* (2006.01)
*G01K 11/06* (2006.01)

(52) U.S. Cl. .......... 374/102; 374/106; 374/46; 116/216; 422/82.12

(58) Field of Classification Search ................ 374/102, 374/106, 46; 116/216; 422/82.12
See application file for complete search history.

(56) References Cited

U.S. PATENT DOCUMENTS

| 4,917,503 | A | * | 4/1990 | Bhattacharjee | ................ | 374/102 |
| 5,476,792 | A | * | 12/1995 | Ezrielev et al. | ................... | 436/1 |
| 6,042,264 | A | * | 3/2000 | Prusik et al. | ................... | 374/106 |
| 6,103,351 | A | * | 8/2000 | Ram et al. | ................... | 428/195.1 |
| 6,214,623 | B1 | * | 4/2001 | Simons et al. | .................... | 436/2 |
| 6,514,462 | B1 | * | 2/2003 | Simons | ................ | 422/82.12 |
| 6,544,925 | B1 | * | 4/2003 | Prusik et al. | .................. | 503/201 |
| 6,614,728 | B2 | * | 9/2003 | Spevacek | ..................... | 368/327 |
| 7,223,988 | B2 | * | 5/2007 | Lowe et al. | ................ | 250/484.4 |
| 2007/0158624 | A1 | * | 7/2007 | Weder et al. | .................. | 252/582 |

FOREIGN PATENT DOCUMENTS

| JP | 07-049656 A | 2/1995 |
| JP | 09-295489 A | 11/1997 |
| JP | 11-237599 A | 8/1999 |
| JP | 2004-184920 A | 7/2004 |
| JP | 2005-087057 A | 4/2005 |

* cited by examiner

*Primary Examiner* — Christopher Fulton
(74) *Attorney, Agent, or Firm* — Leydig, Voit & Mayer, Ltd.

(57) ABSTRACT

The invention provides an indicator excellent in constitutional simplicity and capable of indicating both the temperature of an article to be indicated and elapsed time at that temperature, as well as an indicator of simple constitution capable of indicating the level of deformation of the article by external force. Disclosed is an external stimulus indicator including a polymer composition composed of a polymer and a dye, wherein the polymer composition has the dye fixed in a specific molecular dispersion state in the polymer, and when kept at a temperature not lower than a specific temperature for at least a predetermined time or deformed to at least a certain level by external force, changes its color to a hue different from the initial hue thereof.

37 Claims, No Drawings

EXTERNAL STIMULUS INDICATOR AND INDICATION METHOD USING THE SAME

BACKGROUND OF THE INVENTION

1. Field of the Invention

The present invention relates to an external stimulus indicator for indicating the temperature/time history of a predetermined article (referred to hereinafter as a temperature/time history indicator) and in particular to an external stimulus indicator for indicating the temperature/time history in a production process (referred to hereinafter as process check label) or the temperature/time history in a distribution process (referred to hereinafter as distribution history indication label).

The present invention relates to an external stimulus indicator that upon application of external force, can indicate deformation or the level of deformation (quantity of deformation) (referred to hereinafter as deformation level indicator).

The present invention relates to an external stimulus indicator that can detect and indicate the change in polymer morphology by an external stimulus (referred to hereinafter as morphology change indicator).

More specifically, the present invention relates to an external stimulus indicator including a polymer composition composed of a polymer and a dye, wherein the polymer composition has the dye fixed in a specific molecular dispersion state in the polymer, and when kept at a temperature not lower than a specific temperature for at least a predetermined time or deformed to at least a certain level by external force, changes its color to a hue different from the initial hue thereof. The present invention also relates to a method of indicating the history of temperature and time or the quantity of deformation by external force experienced by a predetermined article by applying the indicator to the predetermined article. Further, the present invention relates to a method of detecting the deformation, or the level of deformation, of an article composed of a polymer molded body, by using the deformation level indicator.

2. Description of the Background Art

For example, products sensitive or undurable to heat need attention with regard to storage. Particularly, products such as chemicals sensitive to heat are made unusable once storage maximum temperature is exceeded. When such products are stored, their storage state can be confirmed with e.g. a temperature indicating label as a quality indicating medium. For example, there are materials including inorganic compounds that release water of crystallization upon heating, such as $CoCl_2 \cdot (CH_2)_6 N_4 \cdot 10H_2O$, organic compounds that change their structure upon heating, such as spiropyran, and a system composed of 3 components (that is, a leuco dye, a solid acid, and a compound having an alcoholic hydroxyl group) that undergoes chemical change etc. upon heating, thereby being colored or decolored to indicate a change in temperature.

For example, a temperature indicating sheet for frozen food is known that has a structure in which a polyolefin nonwoven fabric impregnated with an agar aqueous gel, and if necessary a polyolefin nonwoven fabric, are sandwiched between a polyolefin film and a polyolefin film printed with a white oil-based ink containing a water-soluble dye and are jointed via an adhesive on the periphery thereof, wherein before freezing operation, the water-soluble dye is contained in the white oil-based ink and prevented from coloring, but after freezing and when the temperature of the content of the sheet is increased to thawing temperature, the water-soluble dye is dissolved with water exuded through fine pores in the nonwoven fabric, thereby coloring the white oil-based ink-printed face and readily indicating a change in the temperature of the content (see Japanese Patent Laying-Open No. 07-049656).

Further, a known example is a quality indicating medium capable of discriminating the heat history of the temperature environment in which it was stored, and it is constituted of a sheet wherein a liquid crystal/polymer composite membrane including liquid crystalline particles dispersed in a polymer matrix is sandwiched between two electroconductive substrates or between an electroconductive substrate and a protective layer, and wherein the liquid crystal is colored or decolored at a specific temperature, thereby allowing the quality indicating medium to be repeatedly usable in recording the heat history of the temperature atmosphere in which the medium was stored (Japanese Patent Laying-Open No. 11-237599).

Further, a known example is stationery that is provided with a layer in which a temperature-sensitive discoloring color-memory heat discoloration material that upon temperature change, shows hysteresis characteristics to shift the material from a colored to an uncolored state and vice versa or from one colored state to another colored state, wherein a two-phase-retention region in which the two phases of colored and uncolored states can coexist is in the ordinary temperature range, is firmly fixed in a dispersed state in a reversibly thermally discoloring layer, thereby changing a color, a design etc. thereon by an easy means such as change in outside air temperature, contacting with the fingers or friction, to enable disappearance or appearance of various images, thus not only demonstrating a temperature indicating effect but also contributing to design diversification and differentiation (Japanese Patent Laying-Open No. 09-295489).

Furthermore, a known example is a temperature indicating label that includes a support laminated thereon with a heat-sensitive recording layer, a permeable layer composed primarily of a pigment and a binder, a layer containing microcapsules encapsulating a heat-sensitive substance having a melting point of 0° C. or more, and a protective layer in this order, and it records automatic recognition information such as bar code on the heat-sensitive recording layer in a mild thermal environment or in a refrigerating/freezing room, and just before being stuck in a refrigerating/freezing room, is subjected to destruction of the microcapsules by pressurization and then stuck onto a frozen/refrigerated product, thereby irreversibly changing previously recorded images upon exposure of the frozen/refrigerated product to a predetermined temperature of 0° C. or more (Japanese Patent Laying-Open No. 2004-184920).

These conventional indicators that indicate the presence or absence of temperature change are extremely complex in their constitution, and even if experienced temperature can be indicated, they cannot indicate the history of elapsed time at that temperature. Accordingly, it has been desired to provide an indicator that is simple in constitution and can indicate both temperature and time history at that temperature.

Meanwhile, Japanese Patent Laying-Open No. 2005-87057 discloses a method of detecting nucleic acid molecule morphology, including intercalating an immobilized nucleic acid molecule with a dye and then detecting a change in the nucleic acid morphology, from a change in the intensity of fluorescence generated from the dye.

SUMMARY OF THE INVENTION

An object of the present invention is to provide an indicator excellent in constitutional simplicity and capable of indicating both the temperature of an article to be indicated and elapsed time at that temperature (temperature/time history). Further, an object is to provide an indictor of simple constitution that can prevent forgery of the temperature/time history of an article to be indicated.

Another object of the present invention is to provide a novel indicator that can indicate deformation or the level of deformation (quantity of deformation) upon application of external force, particularly a deformation level indicator used in detection of the deformation or the level of deformation in an article composed of a polymer molded body that was subjected to deformation to at least a certain level by external force. Further, an object is to provide a method of detecting the deformation or the level of deformation in the article by using the deformation level indicator.

Furthermore, an object of the present invention is to provide a novel indicator (morphology change indicator) excellent in constitutional simplicity and capable of indicating a change in polymer morphology upon application of an external stimulus. Further, an object is to provide a method of detecting a change in polymer morphology by using the morphology change indicator.

As a result of extensive study for solving the problem, the present inventors have found that the problem can be solved by the following means, and they have arrived at the present invention. That is, the present invention is composed of the following constitutions.

The present invention relates to an external stimulus indicator including a polymer composition composed of a polymer and a dye, wherein the polymer composition has the dye fixed in a specific molecular dispersion state in the polymer, and when kept at a temperature not lower than a specific temperature for at least a predetermined time or deformed to at least a certain level by external force, changes its color to a hue different from the initial hue thereof.

Preferably, the dye exhibits a hue that differs depending on the molecular dispersion state of the dye.

Preferably, the dye is an associative fluorescent dye having a fluorescence wavelength that differs depending on an excimer state and a monomer state.

Preferably, the dye is oligophenylenevinylene compounds.

Preferably, the oligophenylenevinylene compound is a compound represented by the following formula:

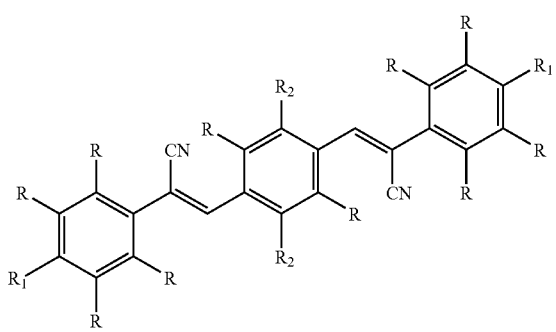

wherein each R independently represents hydrogen, an alkyl group having 1 to 36 carbon atoms, an alkoxy group having 1 to 36 carbon atoms, a hydroxyl group, a hydroxyalkyl group, a halogen group, a phenylenevinylene group or a cyano group; each $R_1$ independently represents hydrogen, an alkyl group having 1 to 36 carbon atoms, an alkoxy group having 1 to 36 carbon atoms, a hydroxyl group, a hydroxyalkyl group, a halogen group, a phenylenevinylene group or a cyano group; and each $R_2$ independently represents hydrogen, an alkyl group having 1 to 36 carbon atoms, an alkoxy group having 1 to 36 carbon atoms, a hydroxyl group, a hydroxyalkyl group, a halogen group, a phenylenevinylene group or a cyano group.

Preferably, the R is hydrogen or a hydroxyl group, $R_1$ is an alkoxy group having 1 to 36 carbon atoms, and $R_2$ is an alkoxy group having 1 to 36 carbon atoms.

Preferably, the $R_1$ or $R_2$ is an alkoxy group having 15 to 36 carbon atoms.

Preferably, the content of the dye in the polymer composition is 0.001 to 20% by weight.

Preferably, the polymer is polyester.

Preferably, the polymer composition is in the form of a film, a fiber or a finely divided material.

In the external stimulus indicator of the present invention, it is preferable that a molecule of the dye is fixed in a monomer state in the polymer.

Preferably, the external stimulus indicator wherein a molecule of the dye is fixed in a monomer state in the polymer is attached to a predetermined article and used as a temperature/time history indicator for indicating the temperature/time history of the predetermined article.

Preferably, the external stimulus indicator wherein a molecule of the dye is fixed in a monomer state in the polymer is used as a process check label for indicating the temperature/time history of a predetermined article in a production process, and when kept at a temperature not lower than a specific temperature for at least a predetermined time, changes its color irreversibly to a hue different from the initial hue thereof.

In the external stimulus indicator used as the process check label, it is preferable that the content of the dye in the polymer composition is 0.01 to 10% by weight.

Preferably, the external stimulus indicator wherein a molecule of the dye is fixed in a monomer state in the polymer is used as a distribution history display label for indicating the history of temperature and time of a predetermined article in a distribution process, and when kept at a temperature not lower than a specific temperature for at least a predetermined time, changes its color irreversibly to a hue different from the initial hue thereof.

In the external stimulus indicator used as the distribution history display label, it is preferable that the content of the dye in the polymer composition is 0.001 to 10% by weight.

Preferably, the external stimulus indicator wherein a molecule of the dye is fixed in a monomer state in the polymer is used as a packaging film for indicating the history of temperature and time of a predetermined article, and when kept at a temperature not lower than a specific temperature for at least a predetermined time, changes its color irreversibly to a hue different from the initial hue thereof.

In the external stimulus indicator used as the packaging film, it is preferable that the content of the dye in the polymer composition is 0.01 to 10% by weight.

In the external stimulus indicator wherein a molecule of the dye is fixed in a monomer state in the polymer, it is preferable that the polymer composition is obtained by mixing the dye with the polymer under heating, thereby dispersing the dye in a monomer state in the polymer, followed by rapid cooling thereof.

Preferably, the external stimulus indicator according to the present invention is in the form of a colored article, a packaging article, or a member thereof.

The present invention relates to a method of indicating the history of temperature and time of a predetermined article by using the external stimulus indicator wherein a molecule of the dye is fixed in a monomer state in the polymer.

The present invention relates to a method of indicating the history of temperature and time of a predetermined article in a production process by using the external stimulus indicator used as the process check label.

The present invention relates to a method of indicating the history of temperature and time of a predetermined article in a distribution process by using the external stimulus indicator used as the distribution history indication label.

The present invention relates to a method of indicating the history of temperature and time of a predetermined article by using the external stimulus indicator used as the packaging film.

In the external stimulus indicator according to the present invention, it is preferable that a molecule of the dye is fixed in an excimer state in the polymer.

Preferably, the external stimulus indicator wherein a molecule of the dye is fixed in an excimer state in the polymer is used as a deformation level indicator for indicating the level of deformation by external force.

Preferably, the external stimulus indicator wherein a molecule of the dye is fixed in an excimer state in the polymer can change its color to a hue different from the initial hue thereof, when deformed to at least a certain level by external force, and is used as a deformation level indicator for detecting the deformation or the level of deformation in an article composed of a polymer molded body that was subjected to deformation to at least a certain level by external force.

In the external stimulus indicator used as the deformation level indicator, it is preferable that the content of the dye in the polymer composition is 0.01 to 20% by weight.

Preferably, the external stimulus indicator used as the deformation level indicator is the article itself composed of a polymer molded body.

Preferably, the external stimulus indicator that is the article itself composed of a polymer molded body is a bottle, a film, a sheet, a fiber or a yarn.

Preferably, the external stimulus indicator used as the deformation level indicator is an adhesive, a paint, a coating or a varnish.

Preferably, the external stimulus indicator wherein a molecule of the dye is fixed in an excimer state in the polymer is used as a morphology change indicator that can change its color to a hue different from the initial hue thereof upon change in polymer morphology by an external stimulus.

In the external stimulus indicator used as the morphology change indicator, it is preferable that the content of the dye in the polymer composition is 0.01 to 10% by weight.

In the external stimulus indicator used as the morphology change indicator, it is preferable that the polymer is a thermoplastic resin.

Preferably, the external stimulus used as the morphology change indicator is a polymer molded body composed of the polymer composition.

In the external stimulus indicator wherein a molecule of the dye is fixed in an excimer state in the polymer, it is preferable that the polymer composition is obtained by dispersing molecules of the dye in an excimer state in the polymer by heat treatment and solidifying them in the same state.

Preferably, the external stimulus indicator wherein a molecule of the dye is fixed in an excimer state in the polymer is a bottle, a film, a sheet, a fiber, an adhesive, a paint, a coating or a varnish.

The present invention relates to a method of indicating the level of deformation, by external force, of the predetermined article by using the external stimulus indicator wherein a molecule of the dye is fixed in an excimer state in the polymer.

The present invention relates to a method of detecting the deformation or the level of deformation in the article by using the external stimulus indicator used as the deformation level indicator, wherein the deformation or the level of deformation in the article is detected based on a change in the hue of the deformation level indicator.

The present invention relates to a method of detecting a change in polymer morphology based on a change in the hue of the morphology change indicator by using the external stimulus indicator used as the morphology change indicator.

The external stimulus indicator of the present invention, when kept at a temperature not lower than a specific temperature for at least a predetermined time or deformed to at least a certain level by external force, can change its color to a hue different from the initial hue thereof, thereby indicating the history of elapsed time at a temperature not lower than a specific temperature or the level of deformation of the indicator by external force. Further, this indicator is stuck to the predetermined article or the like, thereby indicating the history of elapsed time at a temperature not lower than a specific temperature or the level of deformation of the predetermined article by external force For example, when the external stimulus indicator of the present invention is stuck to a packaging material for food or the like, or the external stimulus indicator of the present invention is used as a packaging film, whether food went through a predetermined time at a temperature not lower than a specific temperature or whether food was deformed to at least a certain level by external force can be determined by observing the hue of the external stimulus indicator. Accordingly, it can be confirmed that the food underwent sterilization treatment at a temperature not lower than a specific temperature for at least a predetermined time, that the frozen food was not exposed even once to high temperature for at least a predetermined time, that the food package was not deformed or broken or the like, and the external stimulus indicator of the present invention is effective in guaranteeing and confirming safety for foods, chemicals, etc. Although measurement and recording of accurate temperature and time course in a few objects are made possible by development of present-day electronics devices and sensors, it is very difficult from the viewpoint of costs to know the temperature/time histories of an infinite number of individual articles stored for example in a storehouse, but according to the present invention, the temperature and time histories of an infinite number of individual articles, etc. can be easily known by sticking the indicator to each of the individual articles.

When the external stimulus indicator of the present invention is used as a packaging film, the packaging film cannot be released unlike a label, thus enabling forgery prevention. That is, a label can be released without opening a package and replaced by another label to make forgery easily feasible, but when the packaging film itself indicates the temperature/time history, forgery can be made difficult and can be prevented.

In the present invention, a polymer composition is prepared by selecting the type of dye and polymer used, the compounding ratio, etc., and can be used to easily produce an indicator suitable for detection of desired temperature and desired elapsed time at that temperature.

When the external stimulus indicator of the present invention is used as a deformation level indicator, the indicator upon deformation to at least a predetermined level by external force can change its color to a hue different from the initial hue, and by such discoloration function, the deformation, or the level of deformation (quantity of deformation), of the deformation level indicator can be easily detected based on the change in the hue. In the present invention, such property of the deformation level indicator is utilized. That is, the deformation level indicator of the present invention is adhered, stuck or the like to a predetermined article, or a predetermined article itself is constituted of the deformation level indicator of the present invention, thereby easily detecting the deformation or the level of deformation of the article based on the change in hue of the deformation level indicator (or of the predetermined article itself). Information on the deformation or the level of deformation can be used preferably as information for example for knowing the strain or stress of the article.

When the external stimulus indicator of the present invention is used as a morphology change indicator, the indicator upon change in polymer morphology by an external stimulus can change its color to a hue different from the initial hue, and by such discoloration function, the change in polymer morphology can be easily detected. In the present invention, such property of the morphology change indicator is utilized. That is, the morphology change indicator of the present invention is used as a starting molded body used in production of a predetermined article, thereby easily detecting a change in polymer morphology constituting the article based on a change in the hue of the morphology change indicator.

The external stimulus indicator of the present invention may contain a polymer composition composed of a polymer and a dye fixed in a specific molecular dispersion state in the polymer, and it has a simpler constitution than that of conventional indicators, and can be easily produced by using the polymer composition.

The foregoing and other objects, features, aspects and advantages of the present invention will become more apparent from the following detailed description of the present invention.

DESCRIPTION OF THE PREFERRED EMBODIMENTS

<External Stimulus Indicator>
(Temperature History Indicator)

The polymer composition of the present invention is a composition having a dye fixed in a specific molecular dispersion state in a polymer, and it has a property of changing its color to a hue different from the initial hue when kept at a temperature not lower than a specific temperature for at least a predetermined time. By utilizing such property of the polymer composition, an external stimulus indicator that is attached to a predetermined article and is used to indicate the temperature/time history of the predetermined article can be obtained. Further, the change in the hue of the polymer composition is preferably in stages, and by making the change in stages, the temperature/time history can be indicated in more detail.

(Deformation Level Indicator)

The present invention relates to a "deformation level indicator" capable of indicating deformation or the level of deformation (quantity of deformation) that is used in detecting the deformation or the level of deformation of an article composed of a polymer molded body being subjected to deformation to at least a certain level by external force. The deformation level indicator of the present invention has a property of changing its color to a hue different from the initial hue when deformed to at least a predetermined level by external force. In the present invention, such property is utilized in detection of the deformation or the level of deformation of the article. That is, the deformation or the level of deformation of the article can be detected and evaluated from the change, or the level of change, in the hue of the deformation level indicator. The deformation or the level of deformation of a polymer molded body, and the strain and stress of a polymer molded body, have conventionally been difficult to evaluate, but can be detected and evaluated by a simple and easy means for evaluation that is "change in hue" according to the deformation level indicator of the present invention.

The deformation level indicator of the present invention includes a polymer composition composed of a polymer and a dye fixed in a specific molecular dispersion state in the polymer. The deformation level indicator of the present invention may be either the polymer composition itself or a molded body composed of the polymer composition. In the present invention, the deformation level indicator that is the polymer composition or a molded body composed of the polymer composition is constituted so as to change its color to a hue different from the initial hue when deformed to at least a certain level by external force.

(Morphology Change Indicator)

The present invention relates to a "morphology change indicator" capable of indicating a change in polymer morphology that is used in detecting a change in a polymer constituting an article composed of a polymer molded body. The morphology change indicator of the present invention has a property of changing its color to a hue different from the initial hue when polymer morphology is changed by an external stimulus. In the present invention, such property is utilized in detecting polymer morphology constituting an article or a change in the morphology. That is, a change in the polymer morphology can be detected and evaluated from the change or the level of change in the hue of the morphology change indicator. Information that is hardly detected and evaluated by a usual means can be known by a simple and easy means for evaluation that is "change in hue" of the morphology change indicator.

In this specification, the "polymer morphology" means higher structures (arrangement of molecular chains, entanglement of molecular chains, three-dimensional structure, crystalline structure, amorphous structure, surface/interface structure, composite structure) made up by a primary structure (molecular chain) formed by polymerization reaction of monomers as a starting material of the polymer.

The morphology change indicator of the present invention includes a polymer composition composed of a polymer and a dye fixed in a specific molecular dispersion state in the polymer. The morphology change indicator may be either the polymer composition itself or a molded body composed of the polymer composition. In the present invention, the morphology change indicator that is the polymer composition or a molded body composed of the polymer composition is constituted so as to change its color to a hue different from the initial hue when the polymer morphology is changed by an external stimulus.

<Polymer>

The polymer used in the present invention is not particularly limited as long as it can uniformly disperse and dissolve the dye described later. However, the polymer is preferably a polymer compound with physical properties varying reversibly upon heating and cooling, and from the viewpoint of processability, the polymer is preferably a solvent-soluble polymer or a thermoplastic polymer. Specifically, preferable examples of the polymer include homopolymers such as polyolefins (polyethylenes, polypropylene etc.), cycloolefins and copolymers thereof, polyesters (polyethylene terephthalate (PET), copolymers of PET and 1,4-cyclohexanedimethanol (PETG), polybutylene terephthalate, polyethylene naphthalate, etc.), polycarbonates, polyimides, polyamide-imides, polyether imides, polyurethanes, polyvinyls (polyvinyl chloride, polyvinylidene chloride, polyvinyl fluoride, polytetrafluoroethylene, polychlorotrifluoroethylene, polyvinyl acetate, polyvinyl alcohol, poly-2-vinyl pyridine, polyvinyl butyral, etc.), polystyrenes, polyamides (nylon 6, nylon 6.6, nylon 12, nylon 4.6, etc.), polyacryl nitrile, polyacrylic acids, polyacrylates (polymethyl methacrylate, polymethacrylate, polybutyl acrylate, etc.), polyacetals, polyacrylamides, polyglycolic acid, copolymerized polymers (acrylonitrile butadiene styrene, ethylene vinyl acetate, etc.), polyallyl sulfones, polyphenylene oxides, thermosetting resin, regenerated celluloses (cellophane, cellulose acetate, cellulose acetate butyrate, etc.), natural fibers (wool, silk, cotton, etc.), and synthetic polymers including elastomers such as styrene butadiene copolymers, polybutadiene, ethylene propylene copolymers, polychloroprene, polyisoprene, nitrile rubber, silicon rubber and thermoplastic elastomers or copolymers thereof. Among them, polyesters are preferably used, and particularly PET and PETG are preferably used. In the present invention, the polymer constituting the polymer composition may be one kind of polymer or a mixture of two or more kinds of polymers.

<Dye>

The dye used in the present invention is a dye that exhibits a hue varying depending on the molecular dispersion state of the dye. Further, the dye of the present invention is uniformly dispersed and dissolved in a specific molecular dispersion state in the polymer, and this specific molecular dispersion state is maintained even upon molding of its dispersion composition. When the external stimulus indicator using such a dye is kept at a temperature not lower than a specific temperature for at least a predetermined time or deformed to at least a certain level by external force, the molecular dispersion state of the dye molecules in the polymer composition contained in the indicator is changed, and as a result, resulting in a change in the hue of the dye in the external stimulus indicator. Here, the dye used in the present invention may be a single dye or a mixture of two or more dyes.

Specifically, the dye is preferably a fluorescent dye, more preferably an associative fluorescent dye having a fluorescence wavelength that differs depending on whether the dye is in an excimer state or a monomer state, and even more preferably a fluorescent dye having a wavelength shift of more than 100 nm between excimer emission and monomer emission. The wavelength shift is even more preferably 120 nm or more, and most preferably 150 nm or more.

Usually, when two fluorescent dye molecules approach to each other to cause one molecule to be excited by absorbing light, the molecule forms an excimer (exciplex) with the other molecule in the ground state, to show excimer emission having a longer wavelength than that of monomer emission.

In this specification, the excimer state is a state in which a plurality of molecules are associated with one another or rendered adjacent to one another thereby generating emission of longer wavelength by energy transfer among the molecules than that of emission generated by a single dye molecule. The monomer state, on the other hand, is a state in which molecules remain more apart from one another than in the excimer state so that energy transfer among the molecules does not occur, and therefore, the emission of the dye molecules in this state corresponds to the emission of a single excited molecule upon returning to the ground state. However, the transition boundary between the monomer and excimer states is continuous, and so the dye molecules in the polymer composition go through the state into which the monomer and excimer states are merged, by which the emission of the polymer composition appears to change continuously. Accordingly, the hue of the polymer composition or of a molded body of the polymer composition varies in stages depending on the level of deformation thereof, and it is preferable in knowing temperature history, course and the degree of deformation in detail.

Further, the dye used in the present invention is preferably a dye that shows a different absorption spectrum in the visible light range, depending on whether the dye is in the excimer or monomer state, in order to allow the temperature/time history to be visually confirmed.

The fluorescent dye is preferably oligophenylenevinylene compounds, and examples of the oligophenylenevinylene compounds include preferably a compound represented by the following formula:

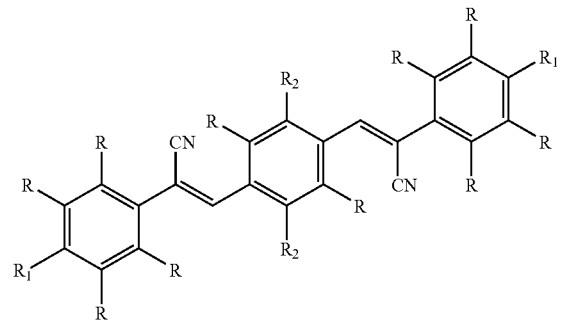

wherein each R independently represent hydrogen, an alkyl group having 1 to 36 carbon atoms, an alkoxy group having 1 to 36 carbon atoms, a hydroxyl group, a hydroxyalkyl group, a halogen group, a phenylenevinylene group or a cyano group;

each $R_1$ independently represents hydrogen, an alkyl group having 1 to 36 carbon atoms, an alkoxy group having 1 to 36 carbon atoms, a hydroxyl group, a hydroxyalkyl group, a halogen group, a phenylenevinylene group or a cyano group; and each $R_2$ independently represents hydrogen, an alkyl group having 1 to 36 carbon atoms, an alkoxy group having 1 to 36 carbon atoms, a hydroxyl group, a hydroxyalkyl group, a halogen group, a phenylenevinylene group or a cyano group.

In the formula above, R is preferably hydrogen or a hydroxyl group, and more preferably hydrogen. Further, $R_1$ is preferably an alkoxy group having 1 to 36 carbon atoms, and more preferably an alkoxy group having 15 to 36 carbon atoms. Further, $R_2$ is preferably an alkoxy group having 1 to 36 carbon atoms, and more preferably an alkoxy group having 1 to 3 carbon atoms. Alternatively, $R_2$ may be a long-chain alkoxy group having 15 to 36 carbon atoms.

<Polymer Composition>

Preferably the polymer composition used in the present invention has suitable compatibility (affinity) between the polymer and dye used. Here, the "suitable compatibility" refers to compatibility to such an extent that a polymer and a dye fixed in a specific molecular dispersion state in the polymer, when kept at a temperature not lower than a specific temperature for at least a predetermined time, change the color thereof irreversibly to a hue different from the initial hue, or to compatibility to such an extent that they change the color to a hue different from the initial hue upon deformation to at least a certain level by external force or upon change in the polymer morphology. For example, in the case where an associative fluorescent dye having a fluorescence wavelength that differs depending on the excimer or monomer state is used, when the compatibility between the dye and the polymer is too low, the two even when mixed with each other even under heating cannot be dissolved and remain separated from each other. Hence, the associative dye molecules in the excimer state cannot be made apart from one another and will not shift to the monomer state. In contrast, when the compatibility between the dye and the polymer is too high, the dye becomes completely dissolved in the polymer, thus dispersing the dye molecules in such a state as to be made apart from one another, and even after heat treatment, their emission will not shift to excimer emission, resulting in failure to show a change in hue.

As a combination of the polymer and the dye that have suitable compatibility with each other, for example when the polymer is a polyester resin (particularly, polyethylene terephthalate, PETG) or a polyolefin (particularly polyethylene), an oligophenylenevinylene compound represented by the above formula wherein $R_1$ or $R_2$ is an alkoxy group having 15 to 36 carbon atoms is used as the dye, thereby making the compatibility between the polymer and the dye suitable, and when the dye in the polymer is kept at a temperature not lower than a specific temperature for at least a predetermined time or deformed to at least a certain level by external force or when the polymer morphology is changed by an external stimulus, the color is changed to a hue different from the initial hue.

The content of the dye in the polymer composition in the present invention is preferably 0.001 to 20% by weight, and more preferably 0.5 to 5% by weight. Particularly when the polymer composition is used as a process check label, a packaging film or a morphology change indicator, it is preferably 0.01 to 10% by weight, and more preferably 0.5 to 5% by weight. In the case of a distribution history indication label, it is preferably 0.001 to 10% by weight, and more preferably 0.01 to 5% by weight. In the case of a deformation level indicator, it is preferably 0.01 to 20% by weight, and more preferably 0.5 to 10% by weight. The content of the dye is adjusted desirably in these ranges, depending on the compatibility between the polymer and the dye, such that when the dye in the polymer composition is kept at a temperature not lower than a specific temperature for at least a predetermined time or deformed to at least a certain level by external force or when the polymer morphology is changed by an external stimulus, the color can be changed to a hue different from the initial hue. Furthermore, the optimum content of the dye (the value bringing about the optimum response of hue change to temperature, deformation and change in morphology as well as the optimum definiteness of hue change) can vary depending on the type of the polymer and dye used, etc., so it is preferable that depending on the type of the polymer and dye used, etc., the content of the dye is adjusted suitably in the above-defined ranges.

The polymer composition composed of the polymer and dye according to the present invention may be composed exclusively of the polymer and dye, but may further contain organic, inorganic and organometallic toners, a fluorescent brightener and the like other than this. By containing one or more of these additives, the color change of the polymer composition can be made further definite. The polymer composition may also contain other arbitrary polymers and other additives such as an electricity regulator, a defoamer, a staining improver, a dye, a pigment, a matting agent, a stabilizer and an antioxidant. The antioxidant that can be used includes antioxidants based on such as aromatic amines and phenols, and the stabilizer that can be used includes stabilizers based on such as phosphorus (for example, phosphoric acid and phosphates), sulfur and amines.

The form of the polymer composition in the present invention is not particularly limited, but is preferably in the form of a film, a fiber or a finely divided material. Here, the finely divided material refers to fine moldings such as particles and thin fragments, and its shape is not particularly limited. When the polymer composition is in the form of a film, the thickness of the film is not particularly limited, but is preferably 10 to 200 μm.

<Form of the External Stimulus Indicator>

The form of the external stimulus indicator of the present invention containing the polymer composition, although not particularly restricted, is preferably in the form of a colored product (article), a packaging article, or a member thereof. Here, the colored product is a product capable of conferring a hue on various articles and includes, for example, a paint, a toner, an ink, an ink for inkjet printer, a coating, etc.

A specific example of the external stimulus indicator of the present invention when used as a colored product includes a dispersion of fine particles of the polymer composition as a colorant component in a solvent. A specific example of the external stimulus indicator as an ink for inkjet printer include an ink containing fine particles of the polymer composition as colored fine particles. Specific examples of the external stimulus indicator when used as one member of a packaging article include a member in which the polymer composition in the form of fibers or film is fixed firmly to a part of a packaging article, a member in which the polymer composition in the form of a finely divided material is incorporated into the component of a packaging article, etc.

When the external stimulus indicator of the present invention is used as a packaging film, the form of the packaging film of the present invention containing the polymer composition includes, but is not limited to, a film composed of the polymer composition itself, a laminated film composed of a film of the polymer composition and another film, and a film compounded with the polymer composition that was finely divided, etc. These films include such as a cast film, a biaxially stretched film, a uniaxially stretched film, a sheet, a laminated film, a coated film, a coextruded film, a hot-melt adhesive film and a vapor-deposited film, and those hardly deformable by external force are preferable. By making the film hardly deformable by external force, its hue showing the history of temperature and time, that is, the dispersion state of dye molecules, can be prevented from undergoing the influence of external force.

By applying the present invention to a packaging film, whether shape change occurred or not during storage can be confirmed in one glance. Further, the polymer composition can also be incorporated into a film material etc., thereby enabling the resulting film to record in detail which part of the film after heating was subjected to force, and can be used not only as a composition for indicating the polymer morphology, but also as a tool for analyzing in detail the polymer morphology by monitoring a change in its spectrum in detail. Furthermore, the dye can be bound to polymer fibers to make color change reversible and can also be used in new fashion materials to render subtle color enjoyable by application to elastic materials for stockings, etc.

First Embodiment

Temperature/Time History Indicator

When the external stimulus indicator of the present invention is used as a temperature/time history indicator, the polymer composition wherein molecules of the dye are dispersed in a monomer state in the polymer is preferably used. In this case, the polymer composition is exposed to a temperature not lower than a specific temperature for at least a predetermined time, whereby the dispersion state of the dye molecules is shifted to an excimer state to change the hue of the dye. Here, the specific temperature is preferably a temperature not lower than the glass transition temperature of the polymer composition. Usually, the dispersion state of the polymer composition will not change at a temperature not higher than the glass transition temperature, but the dispersion state may, even at a temperature not higher than the glass transition temperature, change if it is exposed to the temperature for a very long time, in some cases.

The method of producing the polymer composition wherein the dye is dispersed in a monomer state in the polymer includes, for example, a method wherein the dye is mixed with, and dispersed in, the polymer in solution and then solidified more rapidly than usual in a dispersed state by cooling with water or the like during molding, thereby producing the desired polymer composition. When for example an associative fluorescent dye having a fluorescence wavelength that differs depending on the excimer or monomer state is used as the dye, the dyes have a property of aggregating with one another, thus aggregating gradually in the polymer material having bonds lessened at high temperature, to permit the hue to be changed toward red. The temperature at which the dye and polymer are dissolved is not particularly limited as long as the two can be uniformly dispersed and dissolved, but the temperature is usually a temperature not lower than the glass transition temperature, preferably between glass transition point (K) and glass transition point (K)×2.0, and more preferably between glass transition point (K)×1.1 and glass transition point (K)×1.7.

Second Embodiment

Process Check Label

In the external stimulus indicator used as the process check label of the present invention, the polymer composition wherein molecules of the dye are dispersed in a monomer state in the polymer, and it is the same as in the temperature/time history indicator in the first embodiment, is preferably used.

Further, the polymer composition used in the present invention is not limited to a polymer composition having the dye dispersed in a monomer state in the polymer by melt blending as described above, and may be a polymer composition having the dye in a monomer state by other production methods, for example a polymer composition obtained by solution-blending of dissolving the dye and polymer in a solvent or by copolymerizing the dye with the polymer. The process check label using the polymer composition obtained by copolymerization can decrease the rate of change in hue and can prevent the dye from bleeding out during use. However, it is considered that for allowing such polymer composition to change its hue, the dye be necessary in a larger amount than that of the polymer composition obtained by melt blending, accordingly, the amount of the dye added is increased desirably in the range of up to about 10% by weight.

When the dye is to be copolymerized with the polymer, the terminus of the dye need to have a reactive substituent. Here, the terminus of the dye means the terminus of a substituent such as R, $R_1$ or $R_2$ in the formula above. The reactive substituent is not particularly limited as long as it is a substituent capable of copolymerization with the polymer. Examples of such substituents include a hydroxyl group, an amino group, a carboxyl group, an acrylic acid group, an acrylate group, an isocyanate group, an epoxy group, isocyanate esters and benzoxazines, and among them a hydroxyl group is particularly preferable.

The polymer to be copolymerized with the dye is not particularly limited, and the dye may be copolymerized not only with a main chain of the polymer, but also with a side chain of the polymer in order to control the association property of the dye. Further, as a matrix polymer, a branched polymer, a hyper branch, a dendrimer, or a crosslinked polymer can be used to additionally increase the mobility of the copolymerized dye, thereby clarifying a threshold for color change.

In the method of using the process check label of the present invention to indicate the temperature/time history of a predetermined article, it is preferable to use the process check label using the polymer composition wherein molecules of the dye are fixed in a monomer state in the polymer. A specific example of the method includes a method that includes, for example, attaching the process check label of the present invention as a package for food etc., to observe the hue of the process check label, thereby determining whether food was exposed to a temperature not lower than a specific temperature for at least a predetermined time.

Third Embodiment

Distribution History Indication Label

In the external stimulus indicator used as the distribution history indication label of the present invention, the polymer composition wherein molecules of the dye are dispersed in a monomer state in and fixed to the polymer, it is the same as in the process check label in the second embodiment, is preferably used. A specific example of the method includes a method that includes, for example, attaching the distribution history indication label of the present invention as a package for food etc., to observe the hue of the distribution history indication label, thereby determining whether food was exposed to a temperature not lower than a specific temperature for at least a predetermined time.

Fourth Embodiment

Packaging Film

In the external stimulus indicator used as the packaging film of the present invention, the polymer composition wherein molecules of the dye are dispersed in a monomer state in and fixed to the polymer, it is the same as in the process check label in the second embodiment, is preferably used. A specific example of the method includes a method, for example, attaching the packaging film of the present invention as a package for food etc., to observe the hue of the packaging film, thereby determining whether food was exposed to a temperature not lower than a specific temperature for at least a predetermined time.

Fifth Embodiment

Deformation Level Indicator

Here, when the present invention is applied to a deformation level indicator, a polymer composition having a dye dispersed in an excimer state in a polymer or a molded body composed of the polymer composition is preferably used. When such a polymer composition or a molded body composed of the polymer composition is used as a deformation level indicator, the indicator before deformation shows excimer emission, while upon deformation to at least a predetermined level, the indicator is shifted from the excimer to monomer state (dissociated into monomers) to initiate generation of monomer emission having a different wavelength from that before deformation. Such a polymer composition having a dye dispersed in an excimer state in a polymer or a molded body composed of the polymer composition can be prepared typically by using an associative fluorescent dye having a fluorescence wavelength that differs depending on the excimer or monomer state. Particularly, the dye represented by the formula above can show a significant fluorescence wavelength shift between excimer emission and monomer emission and can also change its absorption wavelength in the visible region, between the excimer state and the monomer state, and can thus be used to produce a deformation level indicator enabling the change in hue by deformation to be recognized even under natural light.

The method of producing the deformation level indicator wherein the dye is dispersed in an excimer state in the polymer includes, but is not limited to, a method wherein the dye is mixed with, and dispersed in, the polymer and then solidified more rapidly than usual in a dispersed state by cooling with water or the like during molding, to prepare a molded body having the dye dispersed in a monomer state, followed by subjecting the molded body to heat treatment etc., thereby allowing the dye molecules in a monomer state to be associated and shifted to an excimer state. The temperature at which the polymer and dye are mixed to disperse the dye in the polymer is not particularly limited as long as the two can be uniformly dispersed and dissolved, but the temperature is usually a temperature not lower than the glass transition temperature, preferably between glass transition point (K) and glass transition point (K)×2.0, and more preferably between glass transition point (K)×1.1 and glass transition point (K)×1.7. Further, the heating temperature at which the molded body having the dye dispersed in a monomer state is heat-treated to allow the dye molecules in a monomer state to be associated and shifted to an excimer state is not particularly limited as long as the dye is shifted to an excimer state. The heating temperature is usually a temperature not lower than the glass transition temperature, preferably between glass transition point (K) and glass transition point (K)×1.5, and more preferably between glass transition point (K)×1.1 and glass transition point (K)×1.4. When heat treatment is conducted under such temperature condition, the associative dye aggregates gradually in the polymer material having bonds lessened at high temperature, to arrive at an excimer state.

Further, another method of producing the deformation level indicator having the dye dispersed in an excimer state in the polymer can be a method wherein the dye is dispersed in the polymer and then removed under gradual cooling without rapid cooling during molding or a method wherein the dye dispersed in the polymer is removed after it is kept warm at a temperature not lower than the glass transition point.

The external stimulus indicator used as the deformation level indicator of the present invention is used in detecting the deformation or the level of deformation of an article composed of the polymer molded body that was deformed by external force. As described above, the deformation level indicator of the present invention has a property of changing its hue upon deformation by external force, and by utilizing this property, the deformation or the level of deformation of an article composed of the polymer molded body can be detected and evaluated. That is, when the deformation level indicator is deformed by external force, a microscopic structure of the polymer constituting the deformation level indicator (for example, the state of arrangement of the polymer molecules in the deformation level indicator, the state of entanglement of the polymer chains, etc.) is changed, whereby the dye molecules fixed for example in an excimer state in the polymer in the deformation level indicator are dissociated physically in a monomer state, to cause a change in hue. Accordingly, the change or the degree of change in hue of the deformation level indicator can be detected for knowing the deformation or the level of deformation of the deformation level indicator. Then, the article itself composed of the polymer molded body to be subjected to detection of deformation or the level of deformation can be used as the deformation level indicator, or alternatively the deformation level indicator can be attached or adhered to the article, whereby the deformation or the level of deformation of the article can be detected based on a change in the hue of the deformation level indicator. Here, the mode and degree of "deformation" generated in the article are not particularly limited as long as the hue change of the deformation level indicator is generated, and examples of the deformation include, for example, elongation, ripping, breakage (bending and breakage), tearing, denting, strain, swelling, etc.

Information on the deformation or the level of deformation based on a change in the hue of the deformation level indicator can be preferably used for example as information for knowing the degree of deterioration or the lifetime of the article. That is, the degree of change (quantity of change) in the hue of the deformation level indicator can be detected to determine the extent where the article is physically deteriorated or whether the lifetime of the article is reached (whether the article is deteriorated to such an extent as not to be continuously usable for its intended purpose, or whether the article is physically deteriorated to such an extent as not to exhibit its required performance). Further, for example, the type, content and combination of the dye and polymer are appropriately adjusted so that when such deformation as to be acknowledged to reach the lifetime of the article is caused, the hue of the deformation level indicator is changed or the color of the deformation level indicator is changed to a specific hue, thereby making it possible to know that the article has reached (or is approaching) the lifetime thereof. Accordingly, the deformation level indicator of the present invention can also be used as "lifetime sensor".

The external stimulus indicator used as the deformation level indicator of the present invention can, as described above, be an article itself composed of the polymer molded body to be subjected to detection of deformation or the degree of deformation. Specific examples in the form of the deformation level indicator in this case include, for example, resin bottles, films, sheets, fibers, yarns, caps for bottles etc., shrinkable films, and packages. For example, when the deformation level indicator is applied to a package for such as foods and chemicals, it can be easily determined based on a change in the hue of the package that the package is not deformed, broken or opened during transportation or storage. Hence, it is effective in guaranteeing and confirming the safety of foods, chemicals etc. When the deformation level indicator is also applied to resin bottles, films, sheets, fibers, yarns or shrinkable films, it can be similarly easily determined whether deteriorations originating in elongation, ripping, breakage (bending and breakage), tearing, etc. occur or not, or whether the lifetime is reached or not. Further, conventionally, a cap for beverage bottle etc. has been known that includes both a cap body being detached from a bottle by rotating a cap to open the bottle and a remaining part of the cap being fixed to the bottle and remains in the bottle even after the cap body is detached, wherein the cap body and the remaining part when making the bottle airtight are bound to each other with such binding force that the two can be detached from each other by rotating the cap body. By confirming in such a cap whether the cap body and the remaining part are detached from each other or not, it is possible to determine whether the bottle has previously been opened or not. However, whether the cap body and the remaining part are detached from each other is difficult to determine in one glance and often cannot be determined until the cap body is actually rotated. If the deformation level indicator of the present invention is applied to such a cap, whether the cap body and the remaining part are detached or not can be determined in one glance based on a change in hue, to permit easy confirmation of the sealing state of the cap.

The external stimulus indicator used as the deformation level indicator of the present invention may also be in the form of a polymer composition for an adhesive, a paint, a coating or a varnish. The deformation level indicator in such a form can be prepared for example by finely dividing or powdering a molded body having the dye dispersed in an excimer state in the polymer and using the product as a binder resin to be contained in such a composition. The deformation level indicator in the form of such a polymer composition can be applied for example onto a desired site of an article composed of the polymer molded body to be subjected to detection of deformation or the level of deformation, etc., thereby making it possible to adhere to the article to use. In this case, the deformation or the level of deformation of the article can be detected based on a change in the hue of the deformation level indicator adhered to the article. However, when the deformation level indicator is in the form of the polymer composition, the polymer constituting the deformation level indicator and the polymer constituting the article are preferably the same in order that the change in hue of the deformation level indicator can more accurately reflect the deformation or the level of deformation of the article. Further, when the deformation level indicator of the present invention is used an adhesive, a paint, a coating or the like, it is possible to evaluate for example the degree of deterioration, or the lifetime, of a structure onto which the indicator was applied.

The external stimulus indicator used as the deformation level indicator of the present invention can also be in the form of a film, a sheet or the like. When the deformation level indicator in the form of a film or sheet is used by sticking it to an article, the deformation or the level of deformation of the article can be detected in the same manner as in the form of the polymer composition.

Here, the external stimulus indicator used as the deformation level indicator of the present invention is not limited to those having the dye dispersed in an excimer state in the polymer by melt blending as described above, and may also be those having the dye dispersed in an excimer state by other production methods, for example those using a polymer composition obtained by solution blending of dissolving the dye and polymer in a solvent or by copolymerization of the dye with the polymer. The deformation level indicator using the polymer composition obtained by copolymerization can decrease the rate of change in hue and can prevent the dye from bleeding out during use. Particularly, the color change of the polymer composition obtained by copolymerization into an elastomer is reversible and can be used in detecting deformation repeatedly by selecting the optimum composition. However, it is considered that for allowing such polymer composition to change its hue, the dye be necessary in a larger amount than that of the polymer composition obtained by melt blending, and the amount of the dye added is increased desirably in the range of up to about 20% by weight.

When the dye is to be copolymerized with the polymer, the terminus of the dye need to have a reactive substituent. Here, the terminus of the dye means the terminus of a substituent such as R, $R_1$ or $R_2$ in the formula above. The reactive substituent is not particularly limited as long as it is a substituent capable of copolymerization with the polymer. Examples of such substituents include a hydroxyl group, an amino group, a carboxyl group, an acrylic acid group, an acrylate group, an isocyanate group, an epoxy group, isocyanate esters and benzoxazines, and among them a hydroxyl group is particularly preferable.

The polymer to be copolymerized with the dye is not particularly limited, and the dye may be copolymerized not only with a main chain of the polymer, but also with a side chain of the polymer in order to control the association property of the dye. Further, as a matrix polymer, a branched polymer, a hyper branch, a dendrimer, or a crosslinked polymer can be used to additionally increase the mobility of the copolymerized dye to clarify a threshold for color change.

Sixth Embodiment

Morphology Change Indicator

In the external stimulus indicator used as the morphology change indicator of the present invention, a polymer composition having a dye dispersed in an excimer state in a polymer or a molded body composed of the polymer composition is preferably used. When such a polymer composition or a molding composed of the polymer composition is used as a morphology change indicator, the indicator before change in the polymer morphology shows excimer emission, while upon change in the morphology, the indicator is shifted from the excimer to monomer state (dissociated into monomers) to initiate generation of monomer emission having a different wavelength from that before the change. Such a polymer composition having a dye dispersed in an excimer state in a polymer or a molded body composed of the polymer composition can be prepared typically by using an associative fluorescent dye having a fluorescence wavelength that differs depending on the excimer or monomer state. Particularly, the dye represented by the formula above can show a significant fluorescence wavelength shift between excimer emission and monomer emission and can also change its absorption wavelength in the visible region, between the excimer state and the monomer state, and can thus be used to produce a morphology change indicator enabling the change in hue by deformation to be recognized even under natural light.

The method of producing the morphology change indicator wherein the dye is dispersed in an excimer state in the polymer includes, but is not limited to, a method wherein the dye is mixed with, and dispersed in, the polymer and then solidified more rapidly than usual in a dispersed state by cooling with water or the like during molding, to prepare a molded body having the dye dispersed in a monomer state, followed by subjecting the molded body to heat treatment etc., thereby allowing the dye molecules in a monomer state to be associated and shifted to an excimer state. The temperature at which the polymer and dye are mixed to disperse the dye in the polymer is not particularly limited as long as the two can be uniformly dispersed and dissolved, but the temperature is usually a temperature not lower than the glass transition temperature, preferably between glass transition point (K) and glass transition point (K)×2.0, and more preferably between glass transition point (K)×1.1 and glass transition point (K)×

1.7. Further, the heating temperature at which the molded body having the dye dispersed in a monomer state is heat-treated to allow the dye molecules in a monomer state to be associated and shifted to an excimer state is not particularly limited as long as the dye is shifted to an excimer state. The heating temperature is usually a temperature not lower than the glass transition temperature, preferably between glass transition point (K) and glass transition point (K)×1.5, and more preferably between glass transition point (K)×1.1 and glass transition point (K)×1.4. When heat treatment is conducted under such temperature condition, the associative dye aggregates gradually in the polymer material having bonds lessened at high temperature, to arrive at an excimer state.

Further, another method of producing the morphology change indicator having the dye dispersed in an excimer state in the polymer includes a method of dispersing the dye in the polymer and then plasticizing (swelling) the polymer in a specific gas or liquid; a method of dispersing the dye in the polymer and then storing it for a long time at a temperature not higher than the glass transition point; and a method of dispersing the dye in a polymer alloy having a plurality of polymers mixed therein.

The morphology change indicator of the present invention is used in detecting the change, by an external stimulus, in the polymer morphology constituting an article composed of the polymer molded body. As described above, the morphology change indicator of the present invention has a property of changing its hue upon change in the polymer morphology by an external stimulus, and by utilizing this property, the change in the polymer morphology forming an article composed of the polymer molded body can be detected and evaluated. More specifically, the behavior for the dye molecules dispersed for example in an excimer state to be dissociated to a monomer state by an external stimulus exerted on the morphology change indicator is related closely to a microscopic structure of the polymer constituting the morphology change indicator (for example, a change in the state of arrangement of polymer molecules in the morphology change indicator, a change in the state of entanglement among polymer chains, etc.), accordingly, the change in, and the degree of change (amount of change) in, the hue of the morphology change indicator is an indicator of the change (and the amount of change) in the polymer morphology. According to the present invention, the "polymer morphology", that is, information that is hardly detected and evaluated by a usual means, can be known by a simple and easy means for evaluation, that is, the "change in hue" of the morphology change indicator. The morphology change indicator can also be used as a tool for analyzing in detail the polymer morphology by monitoring its spectral change in detail.

As described above, the morphology change indicator of the present invention can be used to know a change in the polymer molded body morphology or the degree of the change. Hence, for example, whether residual stress is generated in a part of a polymer product subjected to deformation by molding, or whether strain and irregularity are generated in the product, or the degree thereof, can be detected based on a change in the hue of the morphology change indicator and the degree of the change. By using the morphology change indicator of the present invention, enthalpy relaxation, residual stress, stress relaxation, molecular rearrangement, ordering and free volume, etc., can be detected and evaluated as a minute change in an amorphous portion of the polymer molded body. Furthermore, crystallinity, crystalline size, crystalline dispersion, crystal interface, and crystal defect can also be evaluated as a change in the morphology in a crystalline portion of the polymer molded body.

A specific form of the morphology change indicator of the present invention is not particularly limited. An example thereof is a starting molded body used in producing an article composed of the polymer molded body to be subjected to detection of change in the polymer morphology. Specific examples of the starting molded body include, but are not limited to, a blow molding parison for use of an article composed of the polymer molded body as a bottle such as a PET bottle and a pellet-shaped molded body for use of an article composed of the polymer molded body as a film or a sheet etc., for example. In these examples, the morphology change indicator is prepared as a starting molded body formed from the polymer composition containing the polymer and dye. In the case where a resin bottle is produced from a parison by blow molding is described as an example, a parison showing excimer emission for example is subjected to blow molding to produce a bottle. The polymer morphology in the bottle has been changed by deformation during molding, thereby exhibiting monomer emission at the site where the dye molecules are shifted to a monomer state. This site at which monomer emission is exhibited is a site at which the polymer morphology has been changed by deformation. Further, in this case, the degree of shift from the excimer to monomer state varies depending on the degree of change in the polymer morphology, and thus the degree of change in the hue before and after blow molding may vary depending on the site of the bottle, in some cases. Based on the degree of change in the hue, the degree of change in the polymer morphology can be detected to evaluate whether residual stress is generated in the bottle product, or whether strain and irregularity are generated therein, or the degree thereof, etc. The thus obtained information on the polymer morphology can be preferably used for example in determination and evaluation of molding conditions and storage conditions of the article. Here, even when the starting molding is other than a parison, detection and evaluation can be carried out in a similar manner.

Further, the morphology change indicator of the present invention may be in the form of a film, a sheet or the like. The morphology change indicator of the present invention may also be in the form of a polymer composition such as an adhesive, a paint, a coating or a varnish. In this case, the morphology change indicator is the polymer composition itself containing the polymer and dye.

In the present invention, the article composed of the polymer molded body to be subjected to detection of change in the polymer morphology includes not only the bottle, film and sheet mentioned above, but also fibers, yarns, etc.

Here, the morphology change indicator of the present invention is not limited to those having the dye dispersed in an excimer state in the polymer by melt blending as described above, and may also be those having the dye dispersed in an excimer state by other production methods, for example those using a polymer composition obtained by solution blending of dissolving the dye and polymer in a solvent or by copolymerization of the dye with the polymer. The morphology change indicator using the polymer composition obtained by copolymerization can decrease the rate of change in hue and can prevent the dye from bleeding out during use. However, it is considered that for allowing such polymer composition to change its hue, the dye be necessary in a larger amount than that of the polymer composition obtained by melt blending, and the amount of the dye added is increased desirably in the range of up to about 10% by weight.

When the dye is to be copolymerized with the polymer, the terminus of the dye need to have a reactive substituent. Here, the terminus of the dye means the terminus of a substituent such as R, $R_1$ or $R_2$ in the formula above. The reactive substituent is not particularly limited as long as it is a substituent capable of copolymerization with the polymer. Examples of such substituents include a hydroxyl group, an amino group, a carboxyl group, an acrylic acid group, an acrylate group, an isocyanate group, an epoxy group, isocyanate esters and benzoxazines, and among them a hydroxyl group is particularly preferable.

The polymer to be copolymerized with the dye is not particularly limited, and the dye may be copolymerized not only with a main chain of the polymer, but also with a side chain of the polymer in order to control the association property of the dye. Further, as a matrix polymer, a branched polymer, a hyper branch, a dendrimer, or a crosslinked polymer can be used to additionally increase the mobility of the copolymerized dye to clarify a threshold for color change.

<Method of Indicating the Temperature/Time History>

In the method of indicating the temperature/time history of a predetermined article, the external stimulus indicator (the temperature/time history indicator, the process check label or the distribution history indication label) using the polymer composition having the dye molecules fixed in a monomer state in the polymer is preferably used. A specific example of the method includes a method that includes sticking the external stimulus indicator of the present invention to a package for food etc. or using the external stimulus indicator of the present invention as a member of a package itself, thereby determining whether food was exposed to a temperature not lower than a specific temperature for at least a predetermined time with observing the hue of the external stimulus indicator. A method wherein a colored article containing the polymer composition in the form of a finely divided material such as fine particles is applied onto a package for food etc., thereby indicating the history of temperature and time can also be included.

<Method of Indicating the Level of Deformation and Method of Indicating a Change in Morphology>

In the method of indicating the level of deformation of a predetermined article by external force and the change in the morphology thereof, the external stimulus indicator (the deformation level indicator, the morphology change indicator) using the polymer composition having dye molecules fixed in an excimer state in the polymer is preferably used. A specific example of the method includes a method that includes sticking the external stimulus indicator of the present invention to a package for food etc. or using the external stimulus indicator of the present invention itself as a member of a package, thereby determining whether it was deformed to at least a predetermined level by external force with observing the hue of the external stimulus indicator. A method wherein the external stimulus indicator is incorporated into a material of a film, fibers etc., thereby indicating the level of deformation of the film, fibers etc. by external force in a molding process can also be mentioned.

EXAMPLES

Hereinafter, the present invention is described in more detail by reference to the Examples and Comparative Examples.

Here, in the following examples, the solution viscosity (reduced viscosity $\eta sp/c$ (dl/g)) of a polyester resin was determined by dissolving 0.10 g of the polyester resin in 25 cc of a mixed solvent of phenol/tetrachloroethane (mass ratio 6/4) and measuring the solution at 30° C. with an Ubbellohde viscometer. Further, the glass transition point was measured at an increasing temperature of 10° C./min. in a nitrogen gas atmosphere with a differential scanning calorimeter (DSC) (model number: DSC2920) manufactured by TA Instruments, Inc.

Example 1

Process Check Label (Production of a Polymer Composition)

A reaction container provided with a thermometer, a stirrer and a reflux condenser was charged with diols/dicarboxylic acids in a molar ratio of 1.5 such that the resulting copolymerized polyester resin had a composition of 47 parts by mole of terephthalic acid, 42 parts by mole of isophthalic acid, 11 parts by mole of sebacic acid, 56 parts by mole of ethylene glycol and 44 parts by mole of neopentyl glycol, and charged additionally with 0.3 parts by mole of triethylamine as an additive. The mixture was gradually heated over 4 hours to 230° C. at 2 atmospheric pressure in a nitrogen atmosphere and was subjected to esterification reaction while distilled water was removed out of the system. Subsequently, after the system was returned to ordinary pressure, 0.11 parts of titanium tetrabutoxide was added to the mixture to stir for 5 minutes, and then subjected to early polymerization at a pressure reduced over 30 minutes to 10 mmHg while the temperature was increased to 250° C., followed by another late polymerization at 1 mmHg or less for 60 minutes, to give a copolymerized polyester resin. The glass transition temperature of the copolymerized polyester resin was 45° C., and the solution viscosity was 0.54. Thereafter, the resulting copolymerized polyester resin was re-melted and then melt-blended for 10 minutes by adding C18RG dye of the above formula wherein R is hydrogen, $R_1$ is an octadecyloxy group ($C_{18}H_{37}O$) and $R_2$ is a methoxy group, in an amount of 1% by weight based on the resulting copolymerized polyester resin, to give the polymer composition of the present invention wherein the dye was monodispersed in the copolymerized polyester resin.

(Production of a Colored Article)

A 10-L four-neck separable flask provided with a thermometer, a condenser and a stirring blade was charged with 100 parts by weight of the polymer composition obtained above, 200 parts by weight of methyl ethyl ketone and 200 parts by weight of toluene, and the mixture was dissolved under stirring at a kept temperature of 70° C.

The solution obtained by the above process was applied onto a polyester film, and after volatilization of the solvent at 160° C., the film was cooled rapidly by air-drying, to give a green coated film. A change with time in the hue of this film stored at 60° C. is shown in Table 1.

TABLE 1

| | Elapsed Time | | | | |
|---|---|---|---|---|---|
| | 0 min. | 15 min. | 30 min. | 45 min. | 60 min. |
| Example 1 (Coated film) | Green | Yellowish green | Yellowish green | Orange | Reddish orange |

(Production of a Process Check Label Sheet)

The dye used in this example was C18RG represented by the above formula wherein R is hydrogen, $R_1$ is an octadecyloxy group ($C_{18}H_{37}O$), and $R_2$ is a methoxy group. Using a twin-screw extruder, the dye was melt-blended in PET such that the content of the dye became 0.9% by weight, followed by hot pressing at 280° C. and subsequent rapid cooling with cold water to yield a fluorescent dye-containing PET film having a thickness of 200 µm. The resulting film exhibited yellowish green monomer emission, had a glass transition temperature of 75° C. and a solution viscosity of 0.7.

An acrylic pressure sensitive adhesive (SK1335 manufactured by Soken Chemical & Engineering Co., Ltd.) was applied in a thickness of 5 µm onto one side of this film to form a pressure sensitive adhesive layer, to produce the process check label sheet of the present invention. Here, the pressure sensitive adhesive used is not particularly limited. As the form, an emulsion, a solvent, a hot melt or the like can be selected without restriction. As the material, a general material such as an acryl-based material, a rubber-based material (natural rubber, SBR, butyl rubber), a silicone-based material, a fluorine resin-based material, and a polyester-based material may also be used. In uses where heat resistance and weatherability are particularly required, a silicone adhesive is preferably used. The sheet was cut into 5 mm×15 mm and then kept at a temperature of 90, 100 or 120° C. on a hot plate. A change with time in the hue of the sheet thus kept under UV light is shown in Table 2.

TABLE 2

| | Elapsed Time | | | | | |
|---|---|---|---|---|---|---|
| | 1 min. | 3 min. | 5 min. | 10 min. | 30 min. | 1 hour |
| 90° C. | — | — | — | Yellowish green | Yellowish green | Yellowish green |
| 100° C. | Yellowish green | Yellowish green | Yellow | Orange | Orange | Orange |
| 120° C. | Orange | Orange | Orange | — | — | — |

In Table 2, the color of the process check label sheet obtained in Example 2 was changed to orange when the temperature-time product was increased to a predetermined value or more. This phenomenon is one wherein C18RG dye is aggregated at a temperature not lower than the glass transition point (75° C.) of PET, thereby exhibiting excimer emission. Further, the discoloration rate of the film at a certain temperature was found to increase single-exponentially with dye concentration and temperature. That is, the temperature-time product until color discoloration can be designed at will by the concentration of the dye and the glass transition point of the matrix polymer.

(Preparation of a Packaging Film)

The dye used in this example was C18RG represented by the above formula wherein R is hydrogen, $R_1$ is an octadecyloxy group ($C_{18}H_{37}O$) and $R_2$ is a methoxy group. Using a twin-screw extruder, the dye was melt-blended in PET such that the content of the dye became 0.9% by weight, followed by hot pressing at 280° C. and subsequent rapid cooling with cold water to yield a fluorescent dye-containing PET film having a thickness of 200 µm. The resulting film exhibited yellowish green monomer emission, had a glass transition temperature of 75° C. and a solution viscosity of 0.7.

The film was cut into 5 mm×15 mm and then kept at a temperature of 90, 100 or 120° C. on a hot plate. A change with time in the hue of the film thus kept under UV light is shown in Table 3.

TABLE 3

| | Elapsed Time | | | | | |
|---|---|---|---|---|---|---|
| | 1 min. | 3 min. | 5 min. | 10 min. | 30 min. | 1 hour |
| 90° C. | — | — | — | Yellowish green | Yellowish green | Yellowish green |
| 100° C. | Yellowish green | Yellowish green | Yellow | Orange | Orange | Orange |
| 120° C. | Orange | Orange | Orange | — | — | — |

In Table 3, the color of the packaging film obtained in Example 1 was changed to orange when the temperature-time product was increased to a predetermined value or more. This phenomenon is one wherein C18RG dye is aggregated at a temperature not lower than the glass transition point (75° C.) of PET, thereby exhibiting excimer emission. Further, the discoloration rate of the film at a certain temperature was found to increase single-exponentially with dye concentration and temperature. That is, the temperature-time product until color discoloration can be designed at will by the concentration of the dye and the glass transition point of the matrix polymer.

Further, the dye used in Example 1 shows an unique property by which its absorption wavelength in the visible range also varies with excimer formation, and the color change could be clearly distinguished even under natural light. Accordingly, the change in hue of the process check label of the present invention can be detected even under natural light and thus has an excellent advantage that the history of temperature and time can be confirmed without necessity for irradiation with UV light etc.

From the above description, the present invention can provide a general-purpose thermal sensor utilizing an inexpensive polyester material, and its development into various uses such as detection of heat history in processes for producing foods, chemicals etc. can be expected.

Example 2

Distribution History Indication Label

Production of a Polymer Composition

A reaction container provided with a thermometer, a stirrer, a reflux condenser and a distillation tube was charged with diols/dicarboxylic acids in a molar ratio of 1.5 such that the resulting copolymerized polyester resin had a composition of 56.8 parts by mole of terephthalic acid, 40.7 parts by mole of adipic acid, 2.5 parts by mole of dimethyl 5-sodium sulfoisophthalate, 42 parts by mole of ethylene glycol, 57 parts by mole of butane diol and 1 part by mole of polytrimethylene glycol (molecular weight 1000), and charged additionally with 0.1 parts by mole of sodium acetate and 0.03 parts by mole of trimethylphosphoric acid. The mixture was gradually heated over 4 hours to 230° C. at 2 atmospheric pressure in a nitrogen atmosphere and was subjected to esterification reaction while distillated water was removed out of the system. Subsequently, after the system was returned to ordinary pressure, 0.02 parts by mole each of potassium oxalate titanate and antimony trioxide were added to the mixture to stir for 5 minutes, and then subjected to early polymerization at a pressure reduced over 30 minutes to 10 mmHg while the temperature was increased to 250° C., followed by another late polymerization at 1 mmHg or less for 60 minutes, to give a copolymerized polyester resin. The glass transition temperature of the copolymerized polyester resin was −10° C., and the solution viscosity was 0.76. Thereafter, the resulting copolymerized polyester resin was re-melted and then melt-blended for 10 minutes by adding C18RG dye of the above formula wherein R is hydrogen, $R_1$ is an octadecyloxy group ($C_{18}H_{37}O$) and $R_2$ is a methoxy group, in an amount of 1% by weight based on the resulting copolymerized polyester resin, to give the polymer composition of the present invention wherein the dye was monodispersed in the copolymerized polyester resin.

(Production of a Colored Article)

A 10-L four-neck separable flask provided with a thermometer, a condenser and a stirring blade was charged with 100 parts by weight of the polymer composition obtained above, 340 parts by weight of t-butyl cellosolve and 60 parts by weight of water, and the mixture was dissolved under stirring at a kept temperature of 70° C.

The solution obtained by the above process was applied onto a polyester film, and after volatilization of the solvent at 160° C., the film was cooled rapidly by air-drying, to produce a green coated film. A change with time in the hue of this film kept at a temperature of 0° C. is shown in Table 4.

TABLE 4

|  | Elapsed Time | | | | |
| --- | --- | --- | --- | --- | --- |
|  | 0 min. | 15 min. | 30 min. | 45 min. | 60 min. |
| Example 2 (coated film) | Green | Yellowish green | Yellowish green | Yellow | Orange |

(Production of a Distribution History Indication Label Sheet)

A reaction container provided with a thermometer, a stirrer, a reflux condenser and a distillation tube was charged with diol/dicarboxylic acids in a molar ratio of 1.5 such that the resulting copolymerized polyester resin had a composition of 53 parts by mole of terephthalic acid, 47 parts by mole of sebacic acid and 100 parts by mole of ethylene glycol, and charged additionally with 0.3 parts by mole of triethylamine. The mixture was gradually heated over 4 hours to 230° C. at 2 atmospheric pressure in a nitrogen atmosphere and was subjected to esterification reaction while distillated water was removed out of the system. Subsequently, after the system was returned to ordinary pressure, 0.02 parts by mole each of zinc acetate and antimony trioxide were added to the mixture to stir for 5 minutes, and then subjected to early polymerization at a pressure reduced over 30 minutes to 10 mmHg while the temperature was increased to 250° C., followed by another late polymerization at 1 mmHg or less for 60 minutes, to give a copolymerized polyester resin. The glass transition temperature of the copolymerized polyester resin was −28° C., and the solution viscosity was 1.10. Thereafter, the resulting copolymerized polyester resin was re-melted and then melt-blended for 10 minutes by adding C18RG dye of the above formula wherein R is hydrogen, $R_1$ is an octadecyloxy group ($C_{18}H_{37}O$), and $R_2$ is a methoxy group, in an amount of 0.9% by weight based on the resulting copolymerized polyester resin in a twin-screw kneader, then heat-pressed at 280° C., and cooled rapidly with cold water, to give a fluorescent dye-containing copolymerized polyester film having a thickness of 200 μm.

An acrylic pressure sensitive adhesive (SK1335 manufactured by Soken Chemical & Engineering Co., Ltd.) was applied in a thickness of 5 μm onto one side of this film to form a pressure sensitive adhesive layer, to produce the distribution history indication label sheet of the present invention. Here, the pressure sensitive adhesive used is not particularly limited. As the form, an emulsion, a solvent, a hot melt or the like can be selected without restriction. As the material, a general material such as an acryl-based material, a rubber-based material (natural rubber, SBR, butyl rubber), a silicone-based material, a fluorine resin-based material, and a polyester-based material may also be used. In uses where weatherability is particularly required, a silicone adhesive is preferably used. The sheet was cut into 5 mm×15 mm and then kept at a temperature of −20, −10, 0, 10, and 20° C. on a hot plate. A change with time in the hue of the sheet thus kept under UV light is shown in Table 5.

TABLE 5

|  | Elapsed Time | | | | | |
| --- | --- | --- | --- | --- | --- | --- |
|  | 1 min. | 3 min. | 5 min. | 10 min. | 30 min. | 1 hour |
| −20° C. | Green | Green | Green | Green | Green | Green |
| −10° C. | Green | Green | Green | Green | Green | Yellowish Green |
| 0° C. | Green | Green | Green | Yellowish Green | Yellowish Green | Yellowish Green |
| 10° C. | Green | Yellowish Green | Yellow | Yellow | Orange | Orange |
| 20° C. | Yellowish Green | Yellow | Yellow | Orange | Reddish Orange | Reddish Orange |

In Table 5, the color of the distribution history indication label sheet obtained in Example 2 was changed to orange when the temperature-time product reached a predetermined value. This phenomenon is one wherein C18RG dye is aggregated at a temperature not lower than the glass transition point (−28° C.) of the copolymerized polyester resin, thereby exhibiting excimer emission. Further, the discoloration rate of the film at a certain temperature was found to increase single-exponentially with dye concentration and temperature. That is, the temperature-time product until color discoloration can be designed at will by the concentration of the dye and the glass transition point of the matrix polymer.

Further, the dye used in Example 2 shows an unique property by which its absorption wavelength in the visible range also varies with excimer formation, and the color change could be clearly distinguished even under natural light. Accordingly, the change in hue of the distribution history indication label of the present invention can be detected even under natural light and thus has an excellent advantage that the history of temperature and time can be confirmed without necessity for irradiation with UV light etc.

On the other hand, after the film obtained in Example 2 was heat-treated at 100° C. for 30 minutes, then solidified by cooling at room temperature, and cold-stretched at room temperature, the hue of the stretched portion was reversely changed from orange color to yellowish green color, and it was thus confirmed that the film can also function as a deformation indictor.

From the above description, the present invention can provide a general-purpose thermal sensor utilizing an inexpensive polyester material, and its development into various uses such as detection of heat history in processes for producing foods, chemicals etc. can be expected.

Example 3

Deformation Level Indicator (Preparation of a Deformation Level Indicator)

Using a twin-screw kneader, a fluorescent dye (C18RG dye) of the above formula wherein R is hydrogen, $R_1$ is an alkoxy group having 18 carbon atoms ($C_{18}H_{37}O$) and $R_2$ is a methoxy group was melt-blended with a polyethylene terephthalate (PET) resin such that the content of the fluorescent dye became 0.9% by weight, to produce a resin composition. Then, this resin composition was heat-pressed at 280° C. and then cooled rapidly with cold water to yield a fluorescent dye-containing PET film having a thickness of 200 μm. The resulting film exhibited yellowish green monomer emission, had a glass transition temperature of 75° C. and a solution viscosity of 0.7. Next, after the resulting fluorescent dye-containing PET film was heat-treated at 100° C. for 30 minutes and then solidified by cooling at room temperature, thereby producing a deformation level indicator in the form of a film showing orange-colored excimer emission. When this deformation level indicator was cold-stretched at room temperature, the hue of the stretched portion was changed from orange color to yellowish green color.

Example 4

Deformation Level Indicator (Preparation of a Polymer Composition)

A flask was charged with dimethyl terephthalate (2.136 g), butanediol (1.983 g), polytetramethylene glycol 1500 (4.950 g), C12RG-OH dye (0.700 g) of the above formula wherein R is a hydrogen atom, $R_1$ is $C_{12}H_{25}OH$ and $R_2$ is a methoxy group, and titanium tetrabutoxide (0.05% by mol), and the mixture was stirred at 180° C. for 1 hour and then at 220° C. for 30 minutes. Thereafter, the system was depressurized at an increasing temperature rate of 1° C./min. from 220° C. to 265° C., and the mixture was stirred under reduced pressure (0.1 Torr) at 265° C. for 120 minutes. The resulting polymer was removed, then milled and dried overnight at 80° C. under reduced pressure. The glass transition point of this polymer was room temperature or lower, and the melting point was 141° C. The milled polymer and a spacer having a thickness of 200 μm in thickness were sandwiched Teflon® sheets and moreover sandwiched between aluminum plates. This was kept at 280° C. for 1 minute at ordinary pressure on a hot pressing machine (Tester Sangyo Co., Ltd.) and then compression-pressed at 280° C. for 1 minute, to give an orange elastomer film having the dye copolymerized therein. This film showed red emission as excimer emission under UV light (254 nm), and upon elongated 1.5-times by the hand, the color of the stretched portion was changed to yellow. Thereafter, when the hand was removed, the color was returned again to red.

(Production of a Deformation Level Indicator)

The polymer obtained above and an aluminum plate were compression-pressed at 280° C. for 1 minute with a hot pressing machine (Tester Sangyo Co., Ltd.) to produce an aluminum plate laminated with the orange polymer. When the aluminum plate was bent, the color of the bent portion was changed to yellow. Further, when the aluminum plate was recessed and deformed, the color of that portion was changed to yellow. From this result, it can be seen that when the deformation level indicator is applied to a polymer-laminated aluminum can or the like, its deformation and recess can be detected by color change.

Example 5

Morphology Change Indicator (Production of a Morphology Change Indicator)

Using a twin-screw kneader, a fluorescent dye (C18RG dye) of the above formula wherein R is hydrogen, $R_1$ is an alkoxy group having 18 carbon atoms ($C_{18}H_{37}O$) and $R_2$ is a methoxy group was melt-blended with a polyethylene terephthalate (PET) resin such that the content of the fluorescent dye became 0.9% by weight, to produce a resin composition. Then, this resin composition was heat-pressed at 280° C. and then cooled rapidly with cold water to yield a fluorescent dye-containing PET film having a thickness of 200 μm. The resulting film exhibited yellowish green monomer emission, had a glass transition temperature of 75° C. and a solution viscosity of 0.7. Next, after the resulting fluorescent dye-containing PET film was heat-treated at 100° C. for 30 minutes, and then solidified by cooling at room temperature, thereby producing a morphology change indicator in the form of a film showing orange-colored excimer emission. When this morphology change indicator was cold-stretched at room temperature, the hue of the stretched portion was changed from orange color to yellowish green color. This result indicated that the dye was changed from the excimer to monomer state, and it could be known that PET molecular chains in the amorphous portion were stretched and the morphology was significantly changed.

When the above prepared fluorescent dye-containing PET film after cold stretching was stored at room temperature for a long time, the hue was returned with time from yellowish green color to orange color in stages (yellow after 6 months, and orange after 1 year). This result indicated that the dye was gradually changed from the monomer to excimer state, and it could be known that morphology change in which PET molecular chains in the amorphous portion were relaxed (enthalpy relaxation) occurred. It could also be known that the rate of this color change varied depending on the place stretched by cold stretching, and the root portion and the central portion in neck stretching were different in the morphology.

Example 6

Ink for Inkjet Printer (Production of a Polymer Composition)

A polymer composition was obtained in the same manner as in Example 1 except that the compounding ratio of the raw materials in the copolymerized polyester resin was changed to 93 parts by mole of isophthalic acid, 7 parts by mole of dimethyl 5-sodium sulfoisophthalate and 100 parts by mole of diethylene glycol. The glass transition temperature of the resulting polymer was 23° C., and the solution viscosity was 0.63.

(Production of a Colored Article)

100 parts by weight of the polymer composition obtained above were introduced by 4 divided portions into 300 parts by weight of deionized water in a 10-L four-neck separable flask provided with a thermometer, a condenser and a stirring blade, and then the polymer composition was dispersed in the water at 90° C. At this time, the melt of the polymer composition is rapidly cooled with adding deionized water, and thus a water dispersion wherein fine particles of the polymer composition having the dye monodispersed in the polyester resin were dispersed in water can be obtained. Furthermore, the water dispersion was distilled under reduced pressure in the distillation flask to remove an organic solvent, whereby a water dispersion of fine particles composed of the polymer composition was obtained. The average particle size of fine particles of the polymer composition in the water dispersion was 0.25 μm. The average particle size was measured with a light scattering particle-size distribution meter.

The water dispersion obtained in the above process was used to prepare a colored article containing 20.0% by weight (in terms of nonvolatile matter) of colored polyester particles, 4.0% by weight of ethylene glycol, 0.3% by weight of nitritriethanol, and 0.7% by weight of ethyl alcohol. The resulting colored article was used as a bow pen to mark off a line of 0.3 mm in width on recycled paper and evaluated visually for its record integrity. Further, the colored article was similarly used to mark off a line of 0.3 mm in width on Japanese writing paper for calligraphy, and the original line width and the width of the actually drawn line were measured to determine the width of the blurred line. The paper on which the line had been marked off was dipped in deionized water for 5 minutes, and water resistance was evaluated depending on the presence or absence of blurring with the color material. Furthermore, the colored article was filled in a test tube of 10 cm in depth, sealed, and left for 3 months, and after 3 months, its storage stability was evaluated by measuring the presence or absence of precipitates of the recording agent in the bottom of the test tube and by determining the ratio (initial: 100%) of the solid concentration of the recording agent sampled 5 mm below the liquid level to that of the recording agent sampled 1 cm above the bottom. As a result of any of these examinations, there was no serious drawback.

The obtained colored article was charged into an inkjet printer and used in printing letters on gray paper to evaluate letter integrity. As a result, vivid letter printing was feasible without any problems.

A change with time in the hue of this paper printed with green letters stored at a temperature of 40° C. under UV light is shown in Table 6.

TABLE 6

| | Elaspsed Time | | | | |
| --- | --- | --- | --- | --- | --- |
| | 0 min. | 15 min. | 30 min. | 45 min. | 60 min. |
| Example 6 (Printed paper) | Green | Yellowish green | Orange | Orange | Reddish orange |

From the above description, the present invention can provide a general-purpose thermal/deformation sensor utilizing an inexpensive polyester material, and its development into various uses such as detection of the heat history of foods, chemicals etc., as a tool for evaluation of PET morphology, and in the field of security can be expected.

INDUSTRIAL APPLICABILITY

A polymer composition is prepared by selecting the dye used and the type of polymer, the compounding ratio, etc., whereby the external stimulus indicator of the present invention suitable for detection of desired temperature and elapsed time at that temperature can be obtained, and thus the indicator of the present invention can be used effectively in management of safety etc. for foods and chemicals complying with various purposes. Particularly, when an inexpensive PET film is used, various applications of the external stimulus indicator to packaging films, fiber products, industrial materials, security, amenity, and structural analysis can be expected.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An external stimulus indicator comprising a polymer composition composed of a polymer and a dye,
    wherein said polymer composition has the dye fixed in a specific molecular dispersion state in the polymer, and when kept at a temperature not lower than a specific temperature for at least a predetermined time or deformed to at least a certain level by external force, changes its color to a hue different from the initial hue thereof,
    wherein a molecule of said dye is fixed in a monomer state in said polymer, and
    which is attached to a predetermined article and used as a temperature/time history indicator for indicating the history of temperature and time of the predetermined article.

2. The external stimulus indicator according to claim 1, wherein said dye exhibits a hue that differs depending on the molecular dispersion state of the dye.

3. The external stimulus indicator according to claim 1, wherein said dye is an associative fluorescent dye having a fluorescence wavelength that differs depending on an excimer state and a monomer state.

4. The external stimulus indicator according to claim 1, wherein said dye is oligophenylenevinylene compounds.

5. The external stimulus indicator according to claim 4, wherein said oligophenylenevinylene compounds are compounds represented by the following formula:

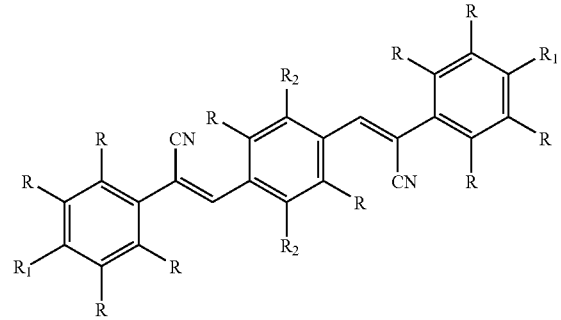

wherein each R independently represents hydrogen, an alkyl group having 1 to 36 carbon atoms, an alkoxy group having 1 to 36 carbon atoms, a hydroxyl group, a hydroxyalkyl group, a halogen group, a phenylenevinylene group or a cyano group,
    each $R_1$ independently represents hydrogen, an alkyl group having 1 to 36 carbon atoms, an alkoxy group having 1 to 36 carbon atoms, a hydroxyl group, a hydroxyalkyl group, a halogen group, a phenylenevinylene group or a cyano group, and
    each $R_2$ independently represents hydrogen, an alkyl group having 1 to 36 carbon atoms, an alkoxy group having 1 to 36 carbon atoms, a hydroxyl group, a hydroxyalkyl group, a halogen group, a phenylenevinylene group or a cyano group.

6. The external stimulus indicator according to claim 5, wherein said R is hydrogen or a hydroxyl group, $R_1$ is an alkoxy group having 1 to 36 carbon atoms, and $R_2$ is an alkoxy group having 1 to 36 carbon atoms.

7. The external stimulus indicator according to claim 5, wherein said $R_1$ or $R_2$ is an alkoxy group having 15 to 36 carbon atoms.

8. The external stimulus indicator according to claim 1, wherein the content of the dye in said polymer composition is 0.001 to 20% by weight.

9. The external stimulus indicator according to claim 1, wherein said polymer is polyester.

10. The external stimulus indicator according to claim 1, wherein said polymer composition is in the form of a film, a fiber or a finely divided material.

11. The external stimulus indicator according to claim 1, which is in the form of a colored article, a packaging article, or a member thereof.

12. A method of indicating the history of temperature and time of a predetermined article by using the external stimulus indicator of claim 1.

13. An external stimulus indicator comprising a polymer composition composed of a polymer and a dye,
wherein said polymer composition has the dye fixed in a specific molecular dispersion state in the polymer, and when kept at a temperature not lower than a specific temperature for at least a predetermined time or deformed to at least a certain level by external force, changes its color to a hue different from the initial hue thereof
wherein a molecule of said dye is fixed in a monomer state in said polymer, and
which is used as a production process check label for indicating the history of temperature and time of a predetermined article in a production process, and when kept at a temperature not lower than a specific temperature for at least a predetermined time, changes its color irreversibly to a hue different from the initial hue thereof.

14. The external stimulus indicator according to claim 13, wherein the content of the dye in said polymer composition is 0.01 to 10% by weight.

15. A method of indicating the history of temperature and time of a predetermined article in a production process by using the external stimulus indicator of claim 13.

16. An external stimulus indicator comprising a polymer composition composed of a polymer and a dye,
wherein said polymer composition has the dye fixed in a specific molecular dispersion state in the polymer, and when kept at a temperature not lower than a specific temperature for at least a predetermined time or deformed to at least a certain level by external force, changes its color to a hue different from the initial hue thereof,
wherein a molecule of said dye is fixed in a monomer state in said polymer, and
which is used as a distribution history display label for indicating the history of temperature and time of a predetermined article in a distribution process, and when kept at a temperature not lower than a specific temperature for at least a predetermined time, changes its color irreversibly to a hue different from the initial hue thereof.

17. The external stimulus indicator according to claim 16, wherein the content of the dye in said polymer composition is 0.001 to 10% by weight.

18. A method of indicating the history of temperature and time of a predetermined article in a distribution process by using the external stimulus indicator of claim 16.

19. An external stimulus indicator comprising a polymer composition composed of a polymer and a dye,
wherein said polymer composition has the dye fixed in a specific molecular dispersion state in the polymer, and when kept at a temperature not lower than a specific temperature for at least a predetermined time or deformed to at least a certain level by external force, changes its color to a hue different from the initial hue thereof,
wherein a molecule of said dye is fixed in a monomer state in said polymer, and
which is used as a packaging film for indicating the history of temperature and time of a predetermined article, and when kept at a temperature not lower than a specific temperature for at least a predetermined time, changes its color irreversibly to a hue different from the initial hue thereof.

20. The external stimulus indicator according to claim 19, wherein the content of the dye in said polymer composition is 0.01 to 10% by weight.

21. A method of indicating the history of temperature and time of a predetermined article by using the external stimulus indicator of claim 19.

22. An external stimulus indicator comprising a polymer composition composed of a polymer and a dye,
wherein said polymer composition has the dye fixed in a specific molecular dispersion state in the polymer, and when kept at a temperature not lower than a specific temperature for at least a predetermined time or deformed to at least a certain level by external force, changes its color to a hue different from the initial hue thereof,
wherein a molecule of said dye is fixed in a monomer state in said polymer, and
wherein said polymer composition is obtained by mixing said dye with said polymer under heating, thereby dispersing the dye in a monomer state in the polymer, followed by rapid cooling thereof.

23. An external stimulus indicator comprising a polymer composition composed of a polymer and a dye,
wherein said polymer composition has the dye fixed in a specific molecular dispersion state in the polymer, and when kept at a temperature not lower than a specific temperature for at least a predetermined time or deformed to at least a certain level by external force, changes its color to a hue different from the initial hue thereof,
wherein a molecule of said dye is fixed in an excimer state in said polymer, and
which is used as a deformation level indicator for indicating the level of deformation by external force.

24. The external stimulus indicator according to claim 23, which can change its color to a hue different from the initial hue thereof, when deformed to at least a certain level by external force, and is used as a deformation level indicator for detecting the deformation or the level of deformation in an article composed of a polymer molded body that was subjected to deformation to at least a certain level by external force.

25. The external stimulus indicator according to claim 24, wherein the content of the dye in said polymer composition is 0.01 to 20% by weight.

26. The external stimulus indicator according to claim 24, which is the article itself composed of said polymer molded body.

27. The external stimulus indicator according to claim 26, which is a bottle, a film, a sheet, a fiber or a yarn.

28. The external stimulus indicator according to claim 24, which is an adhesive, a paint, a coating or a varnish.

29. A method of indicating the deformation or the level of deformation in said article by using the external stimulus indicator of claim 24, wherein the deformation or the level of deformation in said article is detected based on a change in the hue of said deformation level indictor.

30. The external stimulus indicator according to claim 23, wherein said polymer composition is obtained by dispersing molecules of the dye in an excimer state in the polymer by heat treatment and solidifying them in the same state.

31. The external stimulus indicator according to claim 23, which is a bottle, a film, a sheet, a fiber, an adhesive, a paint, a coating or a varnish.

32. A method of indicating the level of deformation, by external force, of the predetermined article by using the external stimulus indicator of claim 23.

33. An external stimulus indicator comprising a polymer composition composed of a polymer and a dye,
   wherein said polymer composition has the dye fixed in a specific molecular dispersion state in the polymer, and when kept at a temperature not lower than a specific temperature for at least a predetermined time or deformed to at least a certain level by external force, changes its color to a hue different from the initial hue thereof,
   wherein a molecule of said dye is fixed in an excimer state in said polymer, and
   which is used as a morphology change indicator that can change its color to a hue different from the initial hue thereof upon change in polymer morphology by an external stimulus.

34. The external stimulus indicator according to claim 33, wherein the content of the dye in said polymer composition is 0.01 to 10% by weight.

35. The external stimulus indicator according to claim 33, wherein said polymer is a thermoplastic resin.

36. The external stimulus indicator according to claim 33, which is a polymer molded body composed of said polymer composition.

37. A method of detecting a change in morphology polymer based on a change in the hue of said morphology change indicator by using the external stimulus indicator of claim 33.

* * * * *